United States Patent [19]
Kirkland

[11] 3,918,739
[45] Nov. 11, 1975

[54] VEHICLE SUSPENSION

[76] Inventor: Arthur C. Kirkland, 4015 Sturtevant, Detroit, Mich. 48204

[22] Filed: Aug. 26, 1974

[21] Appl. No.: 500,417

[52] U.S. Cl. .............................. 280/124 B; 267/57
[51] Int. Cl.² ........................................ B60G 11/20
[58] Field of Search .................... 280/124 B; 267/57

[56] References Cited
UNITED STATES PATENTS

| | | | |
|---|---|---|---|
| 2,565,756 | 8/1951 | Coleman | 267/57 X |
| 3,118,687 | 1/1964 | Forbush | 267/57 X |
| 3,337,236 | 8/1967 | Peterson | 267/57 X |

*Primary Examiner*—Philip Goodman
*Attorney, Agent, or Firm*—John E. McRae; Peter A. Taucher; Robert P. Gibson

[57] ABSTRACT

A vehicle suspension is disclosed wherein upward deflection of a road wheel arm relative to the vehicle produces a reaction force that loads a torsion bar interposed between the road arm and sprung vehicle weight. The road arm is connected to the torsion bar via a linkage whose effective moment arm varies throughout the deflection stroke. The varying moment arm produces a varying loading rate on the torsion bar, which is helpful in providing a desired combination of soft ride (low spring rate portion of the curve) and high load range capability (steeply sloped portion of the curve). The invention has particular application in trailers and other vehicles subject to wide load variations (e.g., an empty truck versus a loaded truck).

3 Claims, 5 Drawing Figures

VEHICLE SUSPENSION

BACKGROUND AND SUMMARY OF THE INVENTION

Conventional vehicle suspensions having a constant spring rate are not entirely satisfactory when the vehicle is intended to operate in differently loaded conditions, e.g., trucks, trailers or buses. When the vehicle is lightly loaded or empty a high spring rate generates considerable vibration and rough ride characteristics. However, when the vehicle is heavily loaded a high spring rate is required to keep road wheel deflection within reasonable limits, e.g., generally less than 10 inches.

U.S. Pat. No. 2,173,652 issued to R. K. Lee on Sept. 19, 1939, and U.S. Pat. No. 2,606,759 issued to J. M. Colby on Aug. 12, 1952, show variable spring rate vehicle suspensions comprising two torsion bars of different stiffness (spring rate) connected in series (or parallel) between the wheel road arm and the vehicle. At low vehicle loadings the low rate torsion bar twists to absorb wheel deflection; the high rate torsion bar remains essentially rigid and inactive. At higher vehicle loadings the low rate torsion bar abuts against a stop structure, permitting the high rate torsion bar to come into play as the load-absorption member.

The above described "two-torsion bar" system has two different spring rates. During the initial wheel deflection period the system has a relatively low spring rate in predominate accordance with the character of the more resilient torsion bar, whereas during the latter stages of the permissible wheel deflection movement the system has a spring rate in accordance with the character of the stiffer torsion bar. The performance curve is a composite of two straight line curves of different slope connected together in step-like fashion.

The present invention is directed to a variable rate suspension having a continuously changing spring rate, as opposed to the "step" change described above. The invention provides a more gradual change from the low rate stage to the high rate stage, hence lessened shock effect because of the absence of the transition from one stage to the other.

In accomplishing the "continuously changing rate" characteristic the present inventor uses a single torsion bar instead of two bars. One force point along the torsion bar is anchored to the vehicle. The other force point on the torsion bar is connected to a "variable moment arm" linkage extending from the wheel road arm. During the initial stages of road arm deflection the linkage produces a relatively small angular adjustment of the torsion bar per unit deflection of the road arm; during the latter stages of road arm deflection the linkage produces a relatively large angular adjustment of the torsion bar per unit deflection of the road arm. The torsion bar adjustment rate preferably varies or changes in a graduated fashion to minimize shock effects.

THE DRAWINGS

Figure 4:
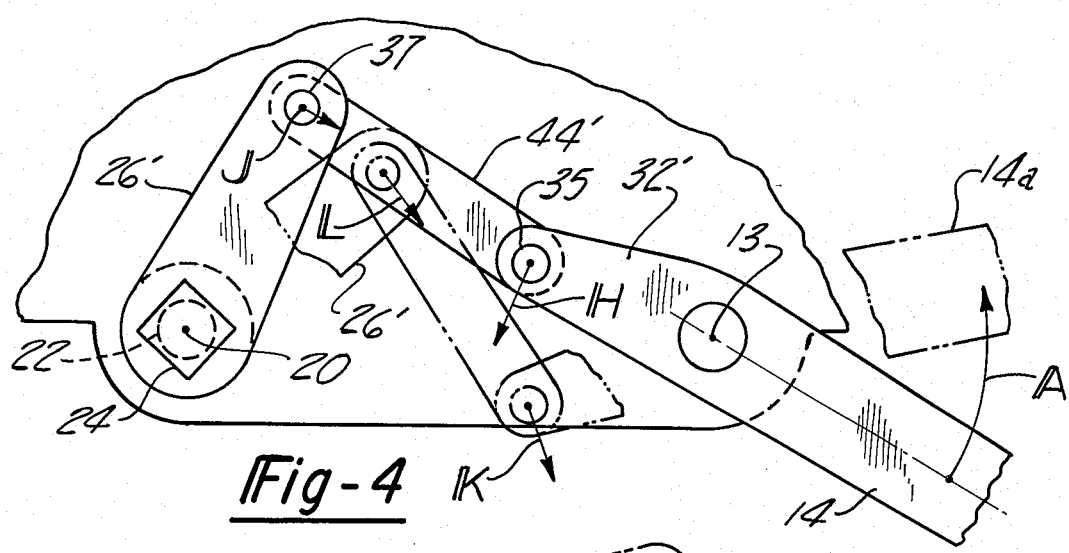
Figure 5:
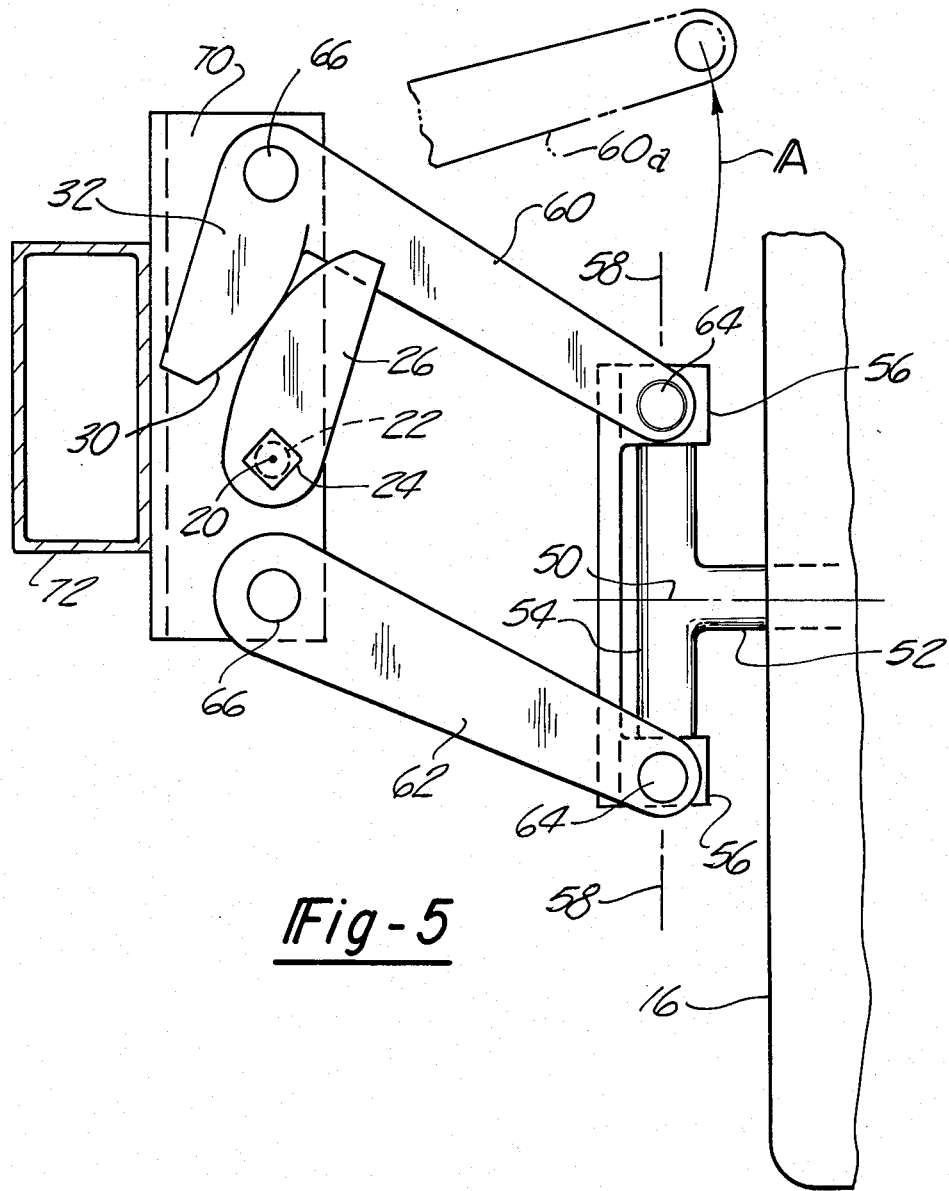

FIGS. 4 and 5 schematically illustrate other embodiments of the invention.

FIG. 1

Figure 1:
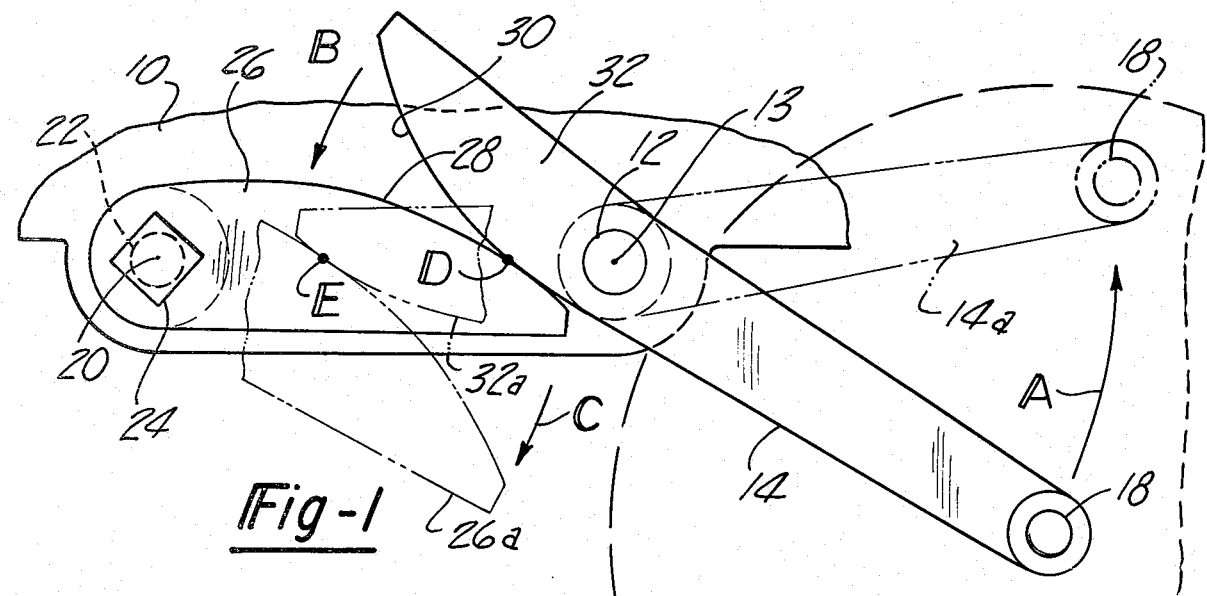
FIG. 1 is a semi-schematic side view of a vehicle incorporating the invention.

FIG. 1 fragmentarily shows a vehicle 10 having a pivot mounting 12 for a swingable wheel road arm 14. The road wheel 16 is rotatably mounted on a suitable spindle 18 carried at the free end of arm 14.

Road arm 14 is capable of upward deflection about swing axis 13 from the full line position to a dashed line elevated position 14a, as denoted by arrow A. Such upward deflection is here taken in a relative sense; i.e., relative to the sprung mass of vehicle 10. In an absolute sense the road arm will always have the same elevation relative to the terrain.

Located on a horizontal axis 20 (paralleling swing axis 13) is a torsion bar 22 having a non-circular enlargement 24 anchoring an end area of the torsion bar to a force arm 26. The other end area of the torsion bar is anchored to the vehicle 10. Suitable bearings, not shown, locate bar 22 on axis 20.

Force arm 26 is formed with a cam surface 28 that rollably engages cam surface 30 on an arm 32 carried by road arm 14. Arms 26 and 32 constitute a linkage between arm 14 and bar 22. As road arm 14 deflects upwardly in the arrow A direction arm 32 moves downwardly about swing axis 13 in the arrow B direction, thereby driving arm 26 downwardly about swing axis 20 in the arrow C direction. Arms 26 and 32 assume the dashed line positions 26a and 32a when arm 14 is in its dashed line position 14a. The dashed line positions define the permissible upper load cushioning limits placed on the suspension system.

During the initial stage of road arm deflection (arrow A direction) arm 32 engages arm 26 at contact point D, so that member 32 has a relatively short moment arm measured from point D to swing axis 13, and member 26 has a relatively long moment arm measured from point D to swing axis 20. Each unit deflection of the road arm thus produces a comparatively small angular adjustment of torsion bar 22, resulting in a small load change. During the last stage of road arm deflection (arrow A direction) arm 32 engages arm 26 at contact point E, so that member 32 then has a relatively long moment arm measured from point E to swing axis 13, and member 26 has a relatively short moment arm measured from point E to swing axis 20. Each unit deflection of the road arm therefore produces a comparatively large angular adjustment of torsion bar 22, resulting in a large load change. Points D and E are located on a line connecting the two swing axes 13 and 20. The relative lengths of the two moment arms continuously change as point D moves toward point E; with the FIG. 1 cam configuration the change in moment arm length is gradual, although the change is not necessarily at a constant rate. The rate of change is a function of the cam contour.

FIG. 3

Figure 3:
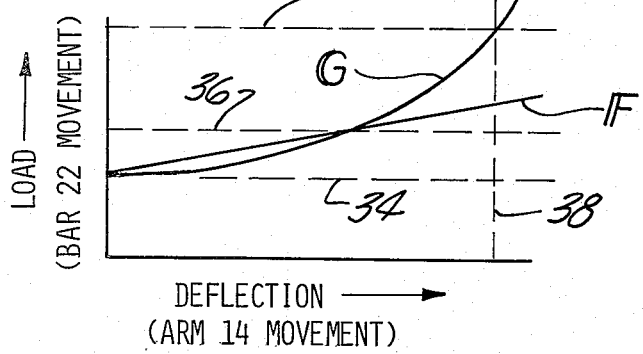
FIG. 3 is a graph depicting deflection-load performance obtainable with the invention.

FIG. 3 graphically illustrates the changes in torsion bar loading produced per unit deflection of the road arm. Line F represents a conventional "straight line" arrangement wherein the torsion bar loading increases uniformly with each unit deflection of the road arm; this is a constant spring rate system. Line G represents the system of FIG. 1 wherein the torsion bar loading increases at a non-uniform rate per unit deflection of the road arm; curve G is a varying spring rate system.

FIG. 3 is marked with an imaginary "starting" load line 34 representing the load on the wheel imposed by an "unloaded" vehicle in the absence of deflection forces due to terrain irregularities and vehicle inertia. FIG. 3 is marked with another imaginary "starting" load line 36 representing the load imposed on the wheel by a "loaded" vehicle in the absence of wheel deflection forces imposed by the terrain, etc. A line 38 is drawn on the graph to represent the maximum permissible wheel deflection; it would correspond to wheel road arm position 14a in FIG. 1. A line 40 is drawn on the graph to represent the maximum expected load imposed on the torsion bar during operations over rough terrain, etc.

It will be seen that the variable rate system of curve G cushionably supports various loads between load values 34 and 40 without exceeding the permissible deflection represented by line 38; the system is not subject to "bottoming" due to loss of cushioning caused by strikage against fixed stops. The conventional constant rate system of curve F will "bottom out" at a load less than maximum load 40; thus, the conventional system is not well suited to handling a wide range of loads such as trailer loads (empty and loaded).

It will be seen that for a considerable portion of the deflection movement curve G has a lesser slope than curve F, i.e., a lesser spring rate. A lower spring rate is a desirable objective since it means a softer ride (because of the lesser load change for any given terrain irregularity). Curve G represents a desirable compromise between a softer ride (minimum slope portion of the curve) and large load range capability (distance between lines 34 and 40 traversed by the steeply sloped portion of the curve).

FIG. 2

Figure 2:
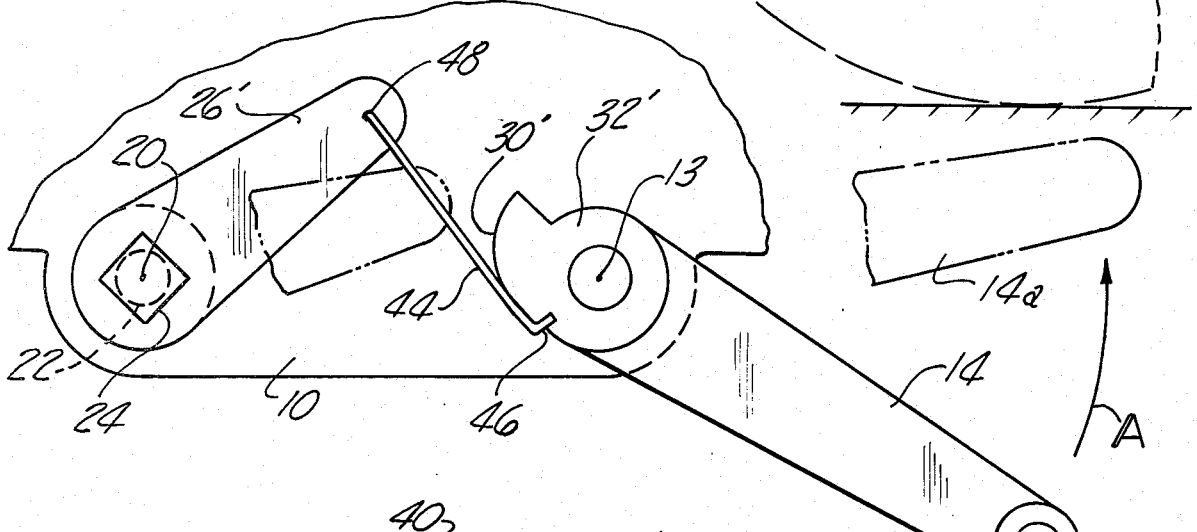
FIG. 2 is a semi-schematic view of another vehicle incorporating the invention.

FIG. 2 illustrates in a semi-schematic fashion another embodiment of the invention. In this case road arm 14 is provided with an arm or extension 32' having a cam surface 30' that includes incremental areas spaced different distances from swing axis 13. A flexible element such as a cable, strap or chain 44 is anchored to arm 32' at anchorage 46. The other end of flexible element 44 is anchored at 48 to an arm 26' carried by torsion bar 22.

During the initial stages of road arm deflection (arrow A direction) element 44 has a small moment arm relative to swing axis 13; therefore each unit deflection of the road arm produces a relatively small change in the bar 22 position, i.e., a small load change. During the latter stages of road arm deflection element 44 has a larger moment arm relative to swing axis 13; accordingly each unit deflection of the road arm produces a larger movement of torsion bar 22, resulting in larger loading change.

The "variable moment arm" nature of cam surface 30' causes the FIG. 2 arrangement to be a variable rate system somewhat similar in performance to the FIG. 1 system. The contour of surface 30' can be selected to provide an operating curve with differently sloped sections in accordance with particular load limits and maximum permissible deflections associated with different vehicle types, designs and sizes.

FIG. 4

FIG. 4 illustrates a variant of the FIG. 2 construction wherein the road arm 14 is connected to force arm 26' by means of a rigid link 44'. Road arm 14 includes an extension 32' having a pivotal connection 35 with line 44'. Link 44' has a pivotal connection 37 with force arm 26'.

Directional arrows H, J, K and L denote the directions taken by arm elements 32' and 26' during upward deflection of road arm 14 toward position 14a. During the initial stag arm element 32' moves in a direction H to generate movement of force arm 26' in direction J. Directional arrow J extends essentially normal to directional arrow H; therefore arm 26' moves slightly more than zero distance per unit angular movement of arm element 32'. This causes the torsion bar 22 to have a low effective spring rate.

During the last stage of upward road arm deflection arm element 32' moves in direction K to generate movement of arm 26' in direction L. Directional arrow L extends essentially parallel to directional arrow K so that arm 26' enjoys substantially greater angular movement per unit movement of arm element 32' (compared to conditions at the initial stage. During the last stage of upward road arm deflection each unit deflection of the road arm produces a relatively large angular movement of the torsion bar, resulting in large load change.

The FIG. 4 structure is similar in general operation to the FIG. 2 structure; i.e., it is capable of producing a variable load rate on the spring per unit road arm deflection, as shown generally at G in FIG. 3.

FIG. 5

FIG. 5 illustrates the FIG. 1 linkage applied to a vehicle wherein the torsion spring bar 22 is located on a rotational axis 20 extending longitudinally of the vehicle, i.e., normal to the rotational axis of the road wheel 16. The wheel is shown schematically as being rotatable on a horizontal axis 50 defined by a spindle 52 projecting from a kingpin 54 that extends between upper and lower pillow blocks 56; kingpin 54 may be provided with a steering arm (not shown) for pivotal movement around a vertical axis 58, as in conventional practice. FIG. 5 is schematic in nature.

Upper and lower road wheel arms 60 and 62 are pivotally connected to the pillow blocks at 64. The other ends of the road wheel arms are pivotally connected at 66 with a bracket 70 suitably welded to a longitudinal frame element 72 of the vehicle. Upward deflection of road wheel 16 causes the upper suspension arm 60 to move toward the dashed line position 60a; the lower suspension arm 62 follows in a generally similar arc.

Torsion bar 22 extends through bracket 70 to a fixed anchorage (not shown) on a remote portion of the vehicle frame. The illustrated end 24 of the torsion bar is secured to a force arm 26 that cams against surface 30 of an arm 32 carried by suspension arm 60. The cam arrangement is structurally and functionally similar to that shown in FIG. 1.

The drawings illustrate different linkage arrangements for translating road arm deflection into a variable rate loading of the torsion spring. Other linkages can be devised to provide the variable rate loading function. This invention is directed to the concept of obtaining a variable rate loading without requirement for more than one torsion spring. The concept achieves a gradual change in loading rate, without the abrupt step-like changes associated with multiple torsion spring arrangements.

I claim:

1. A vehicle suspension comprising a single torsion bar non-rotatably anchored to the vehicle at a first point along its length; a force arm anchored to the torsion bar at a second point along its length to produce wind-up movements of the torsion bar for enabling said bar to resiliently absorb varying vehicle load forces; a road wheel arm mounted on the vehicle for deflecting movement around a swing axis in accordance with vertical displacement of the road wheel relative to the vehicle; and motion-transmitting means between the road arm and force arm, whereby upward deflecting movement of the road arm causes the force arm to wind the bar at the aforementioned second point; said motion-transmitting means being constructed to produce a variable movement of the force arm per unit deflection of the road arm during the permissible stroke of the road arm.

2. The suspension of claim 1 wherein the force arm takes the form of a cam that describes multiple moment arms around the torsion bar axis; said motiontransmitting means comprising a second cam that describes multiple moment arms around the road arm swing axis; said cams being engaged with each other so that the effective moment arm around the torsion bar axis decreases substantially as the effective moment arm around the road arm swing axis increases.

3. A vehicle suspension comprising a single torsion bar non-rotatably anchored to the vehicle sprung mass at a first point along its length; a force arm anchored to the torsion bar at a second point along its length to produce wind-up movements of the torsion bar for enabling said bar to resiliently absorb varying vehicle load forces; a road wheel arm rotatably mounted on the vehicle sprung mass for deflecting movement around a swing axis in accordance with verticle displacement of the road wheel relative to the vehicle sprung mass; and motion-transmitting means between the road arm and force arm, whereby upward deflecting movement of the road arm causes the force arm to wind the bar at the aforementioned second point; said motion-transmitting means comprising a pivotal link operatively trained between a first pivot connection on the road arm and a second pivot connection on the force arm; said pivot connections having movement directions that vary from essentially a right angular relation to essentially a parallel relation during the course of the road arm deflection stroke, whereby there is produced a variable movement of the force arm per unit deflection of the road arm during the permissible stroke of the road arm.

* * * * *